(12) United States Patent
Nakahara

(10) Patent No.: US 11,167,230 B2
(45) Date of Patent: *Nov. 9, 2021

(54) CYCLONE SEPARATION DEVICE

(71) Applicant: Panasonic Intellectual Property Management Co., Ltd., Osaka (JP)

(72) Inventor: Kengo Nakahara, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,668

(22) Filed: Nov. 24, 2020

(65) Prior Publication Data

US 2021/0077931 A1 Mar. 18, 2021

Related U.S. Application Data

(63) Continuation of application No. 16/324,262, filed as application No. PCT/JP2017/029702 on Aug. 21, 2017, now Pat. No. 10,874,996.

(30) Foreign Application Priority Data

Sep. 30, 2016 (JP) .................. 2016-192824

(51) Int. Cl.
*B01D 45/12* (2006.01)
*B04C 5/04* (2006.01)
(Continued)

(52) U.S. Cl.
CPC .............. *B01D 45/12* (2013.01); *B04C 5/04* (2013.01); *B04C 5/103* (2013.01); *B04C 5/185* (2013.01);
(Continued)

(58) Field of Classification Search
CPC ....... B01D 45/12; B01D 53/944; F24F 13/20; F24F 7/00; F24F 2007/003;
(Continued)

(56) References Cited

U.S. PATENT DOCUMENTS 1,539,797 A  5/1925  Chandler et al.
1,897,195 A  2/1933  Howden
(Continued)

FOREIGN PATENT DOCUMENTS

JP  S61-15017 U   1/1986
JP  S62-185867 U  11/1987
(Continued)

OTHER PUBLICATIONS

International Search Report issued in Patent Application No. PCT/JP2017/029702 dated Oct. 31, 2017.
(Continued)

*Primary Examiner* — Dung H Bui
(74) *Attorney, Agent, or Firm* — Pearne & Gordon LLP

(57) ABSTRACT

The cyclone separation device has a case (1), a space partition plate (7), and a cylindrical member (11). The case (1) is formed into a cylindrical shape and has a first intake port (4), an outflow port (6), and a second intake port (5). The first intake port (4) has a circumferential opening (2) circumferentially formed in a side surface on a side of the one end of the case (1), and a fixed blade (3) arranged along the circumferential opening (2). The outflow port (6) is disposed on a surface on the side of the one end and discharges the swirling airflow fed through the first intake port (4). The second intake port (5) is disposed on a side surface on a side of the other end opposite to the one end.

6 Claims, 4 Drawing Sheets

(51) Int. Cl.
  *B04C 5/185* (2006.01)
  *F24F 7/00* (2021.01)
  *B04C 5/103* (2006.01)
  *F24F 13/20* (2006.01)
  *B04C 5/28* (2006.01)
  *A47L 9/16* (2006.01)
  *B01D 53/94* (2006.01)
  *B04C 1/00* (2006.01)

(52) U.S. Cl.
  CPC ............... *B04C 5/28* (2013.01); *F24F 7/00* (2013.01); *F24F 13/20* (2013.01); *A47L 9/165* (2013.01); *B01D 53/944* (2013.01); *B04C 1/00* (2013.01); *F24F 2007/005* (2013.01); *F24F 2007/0025* (2021.01)

(58) Field of Classification Search
  CPC ........ F24F 2007/005; B04C 5/28; B04C 5/04; B04C 5/185; B04C 5/103; B04C 1/00; B04C 5/08; A47L 9/165
  See application file for complete search history.

(56) References Cited

U.S. PATENT DOCUMENTS

| | | |
|---|---|---|
| 1,923,515 A | 8/1933 | Stull |
| 2,929,465 A | 3/1960 | Campbell |
| 3,253,400 A | 5/1966 | Hass |
| 3,485,593 A | 12/1969 | Lenane et al. |
| 3,969,096 A | 7/1976 | Richard |
| 4,486,207 A | 12/1984 | Baillie |
| 4,622,051 A * | 11/1986 | Polach .................. B03C 3/0175 55/417 |
| 4,735,708 A * | 4/1988 | Shah ........................ B04C 7/00 209/155 |
| 5,131,462 A | 7/1992 | Andreasen |
| 6,270,544 B1 | 8/2001 | Mencher et al. |
| 6,702,868 B2 | 3/2004 | Oh et al. |
| 8,512,451 B1 | 8/2013 | Heumann |
| 2007/0214756 A1 | 9/2007 | Lee |
| 2008/0028940 A1 | 2/2008 | Han et al. |
| 2009/0133370 A1 | 5/2009 | Yoo et al. |
| 2017/0087494 A1 | 3/2017 | Lee |

FOREIGN PATENT DOCUMENTS

| | | |
|---|---|---|
| JP | 2003-144825 A | 5/2003 |
| JP | 2008-036579 A | 2/2008 |

OTHER PUBLICATIONS

Written Opinion issued in Patent Application No. PCT/JP2017/029702 dated Oct. 31, 2017.

* cited by examiner

CYCLONE SEPARATION DEVICE

CROSS-REFERENCE TO RELATED APPLICATIONS

This is a continuation of U.S. patent application Ser. No. 16/324,262 filed on Feb. 8, 2019 which is the National Phase Entry of International Application No. PCT/JP2017/029702 filed on Aug. 21, 2017 which claims priority from Japanese Patent Application No. 2016-192824 filed on Sep. 30, 2016. The contents of these applications are incorporated herein by reference in their entireties.

TECHNICAL FIELD

The present disclosure relates to a cyclone separation device.

BACKGROUND ART

As a cyclone separation device of prior art, for example, the structure disclosed in Patent literature 1 is well known. Such a cyclone separating device, which is disposed at an air intake port of an exterior wall of a building, separates foreign matters contained in the outside air so as not to be taken into the inside of the building.

Hereinafter, the cyclone separation device is described with reference to FIG. 6 and FIG. 7.

FIG. 6 is an external perspective view of a conventional cyclone separation device. FIG. 7 is a cross-sectional view taken along the central axis of the device of FIG. 6. As shown in FIG. 6 and FIG. 7, cyclone separation device 100 has circular intake port 102 on one end in the central axis direction, circular outflow port 103 on the other end. Intake port 102 has a plurality of blades 101 radially arranged at regular intervals. The space between intake port 102 and outflow port 103 forms swirl chamber 104 of a cylindrical shape. Blades 101 change the air fed through intake port 102 into swirling airflow, and then the swirling airflow goes out of outflow port 103. Cyclone separation device 100 has separation chamber 105 under swirl chamber 104. Separation chamber 105 accommodates foreign matters separated by the swirling airflow. Further, cyclone separation device 100 has through-hole 106 that provides communication between swirl chamber 104 and separation chamber 105. A foreign matter, which is brought by the swirling airflow to the outer-circumference side of swirl chamber 104, passes through-hole 106 into separation chamber 105.

CITATION LIST

Patent Literature

PTL 1: Japanese Unexamined Patent Application Publication No. 2008-36579

SUMMARY OF THE INVENTION

In such a conventional cyclone separation device, the swirling airflow in the swirl chamber partly flows into the separation chamber through the through-hole, and the swirling airflow flown into the separation chamber goes back to the swirl chamber again, by which the airflow in the separation chamber is disturbed. At that time, foreign matters that have been collected in the separation chamber often get into the disturbed airflow and come back to the swirl chamber and go out of the outflow port—a re-entrainment phenomenon occurs. This has often caused deterioration of separation performance of the conventional cyclone separation device.

The present disclosure addresses the problem above. The cyclone separation device of the present disclosure offers improved separation performance by decreasing the re-entrainment phenomenon.

The cyclone separation device of the present disclosure has a case, a space partition plate, and a cylindrical member. The case is formed into a cylindrical shape and has a first intake port, an outflow port, and a second intake port. The first intake port has a circumferential opening circumferentially formed in a side surface on a side of the one end of the case, and a fixed blade arranged along the circumferential opening. The outflow port is disposed on a surface on the side of the one end and discharges the swirling airflow fed through the first intake port. The second intake port is disposed on a side surface on a side of the other end opposite to the one end. The second intake port is located at the lowermost part of the case when the central axis of the case is kept in a horizontal position. The space partition plate partitions an interior of the case into a first swirl chamber on the inner-circumference side and a second swirl chamber on the outer-circumference side. The space partition plate has a through-hole that provides communication between the first swirl chamber and the second swirl chamber. The cylindrical member is disposed in the first swirl chamber on the side of the other end of the case such that a central axis of the cylindrical member agrees with the central axis of the case. The cylindrical member is disposed such that an end face of the cylindrical member on the side of the outflow port is located within the range of the through-hole in the direction of the central axis. The intended purpose described earlier is obtained by the structure above.

According to the structure of the present disclosure, when air containing foreign matters enters through the intake port, the foreign matters undergo centrifugal force caused by swirling airflow in the first swirl chamber and move, via the through-hole, into the second swirl chamber; the foreign matters are separated from the first chamber to the second chamber. When a negative pressure is caused in the case (i.e., in the device) by turning on an air blower disposed on the downstream side of the outflow port, air enters through the second intake port from the outside, by which the air existing in the second swirl chamber flows back to the first swirl chamber. At that time, the foreign matters that have been taken into the device move from the second swirl chamber toward the central axis of the first swirl chamber and collide with a side surface of the cylindrical member by an inertial force. The foreign matters are stirred up again by the swirling airflow in the first swirl chamber and moved via the through-hole back to the second swirl chamber. In this way, the structure prevents foreign matters in the second swirl chamber from passing through the outflow port; prevents separation performance of the device from deterioration.

DESCRIPTION OF EMBODIMENTS

Figure 1:
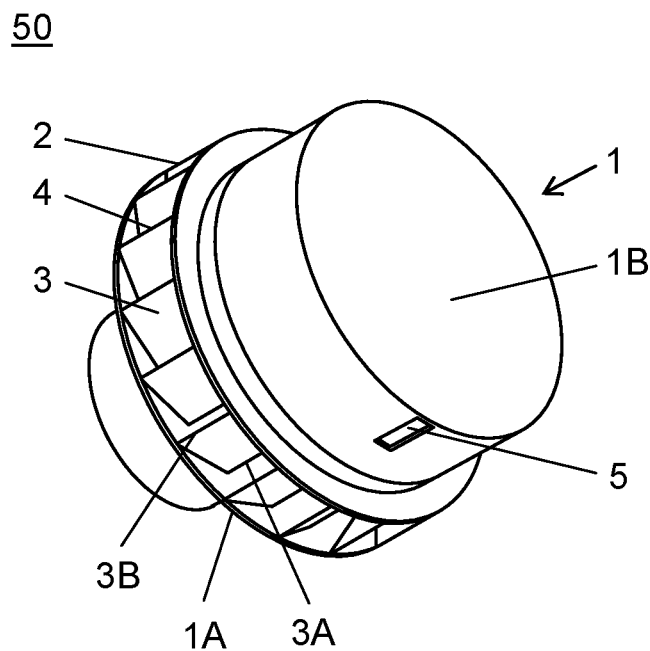
FIG. 1 is an external perspective view of a cyclone separation device in accordance with a first exemplary embodiment of the present disclosure.

The cyclone separation device of the present disclosure has a case, a space partition plate, and a cylindrical member. The case is formed into a cylindrical shape and has a first intake port, an outflow port, and a second intake port. The first intake port has a circumferential opening circumferentially formed in a side surface on a side of the one end of the case, and a fixed blade arranged along the circumferential opening. The outflow port is disposed on a surface on the side of the one end and discharges the swirling airflow fed through the first intake port. The second intake port is disposed on a side surface on a side of the other end that is opposite to the one end of the case. The second intake port is located at the lowermost part of the case when the central axis of the case is kept in a horizontal position. The space partition plate partitions an interior of the case into a first swirl chamber on the inner-circumference side and a second swirl chamber on the outer-circumference side. The space partition plate has a through-hole that provides communication between the first swirl chamber and the second swirl chamber. The cylindrical member is disposed in the first swirl chamber on the side of the other end of the case such that a central axis of the cylindrical member agrees with that of the case. The cylindrical member is disposed such that an end face of the cylindrical member on the side of the outflow port is located within the range of the through-hole in the direction of the central axis.

As described above, the interior of the cylindrical case is partitioned by the space partition plate into the first swirl chamber and the second swirl chamber. The space partition plate has a through-hole that provides communication between the first swirl chamber and the second swirl chamber. In the structure above, outside air enters through the first intake port becomes a swirling airflow and flows into the first swirl chamber. At that time, when a foreign matter is contained in the airflow, it stirs around near the space partition plate due to centrifugal force generated by the swirling airflow and moves into the second swirl chamber via the through-hole. That is, the second swirl chamber is a separation chamber that collects foreign matters separated from the airflow. In the second swirl chamber, the foreign matters are gathered around the lower part of the chamber (i.e., around the second intake port) by gravity. When a natural wind blows outside the device and a cross wind blows near the second swirl chamber, the static pressure at around the second intake port in the outside of the case decreases, as is explained by Bernoulli's theory. That is, when the static pressure in the outside of the device becomes lower than in the second swirl chamber, the accumulated foreign matters are discharged outside of the device. In this way, the foreign matters collected in the second swirl chamber are moved back to the outside.

When a negative pressure is caused in the device by turning on an air blower disposed on the downstream side of the device, outside air enters through the second intake port toward the second swirl chamber. A part of the swirling airflow in the first swirl chamber flows, with directivity, through the through-hole into the second swirl chamber. Therefore, the airflow in the second swirl chamber moves in a direction the same as the airflow in the first swirl chamber; accordingly, the air fed through the second intake port travels with the swirling airflow.

The foreign matters accumulated in the second swirl chamber move around by the swirling airflow generated in the chamber. While swirling, a part of the foreign matters goes to the first swirl chamber via the through-hole. At that time, the airflows go through the through-hole in the opposite two directions: from the first swirl chamber to the second swirl chamber and vice vasa. The airflow moving in the region of the through-hole on the other-end side of the case in the central-axis direction is mostly from the second swirl chamber to the first swirl chamber. Traveling with the airflow, the foreign matters move toward the first swirl chamber in the central-axis direction and collide with a side surface of the cylindrical member by inertia force. Lost the momentum by the collision, the foreign matters are swirled around by the swirling airflow in the first swirl chamber and carried again to the second swirl chamber via the through-hole. The structure of the device decreases the re-entrainment phenomenon (that means the flow-out from the outflow port of the foreign matters accumulated in the second swirl chamber), preventing separation performance from deterioration.

According to the cyclone separation device of the present disclosure, the cylindrical member includes a supporting member and an arc blade. The supporting member is disposed on the end face of the cylindrical member on the side of the outflow port on the central axis of the cylindrical member. The arc blade is circularly bent from the supporting member toward the peripheral end of the cylindrical member. The bend of the arc blade in the direction from the peripheral end of the cylindrical member toward the supporting member is the same as the rotating direction of a swirling airflow generated by the fixed blade. The arc blade is located between the cylindrical member and the outflow port. Two-or-more arc blades are radially arranged around the supporting member.

With the structure above, the cyclone separation device makes swirling airflow in the first swirl chamber collect around the central axis while decreasing by the cylindrical member the re-entrainment phenomenon. This allows the flowing direction of the swirling airflow to change toward the outflow port in the central axis direction, contributing to a decreased pressure loss of the device.

According to the cyclone separation device of the present disclosure, the supporting member has a conical shape whose bottom face has a size the same as the end face of the cylindrical member. The top of the conical supporting member is located on the side of the outflow port.

With the structure above, the cyclone separation device makes swirling airflow in the first swirl chamber collect around the central axis while decreasing by the cylindrical member the re-entrainment phenomenon. This allows the flowing direction of the swirling airflow to change toward the outflow port in the central axis direction. At that time, the cone shape of the member works on the airflow so as to have a further smooth change in direction toward the outflow port, contributing to a further decreased pressure loss of the device.

Hereinafter, the exemplary embodiments of the present disclosure are described with reference to the accompanying drawings.

First Exemplary Embodiment

Figure 2:
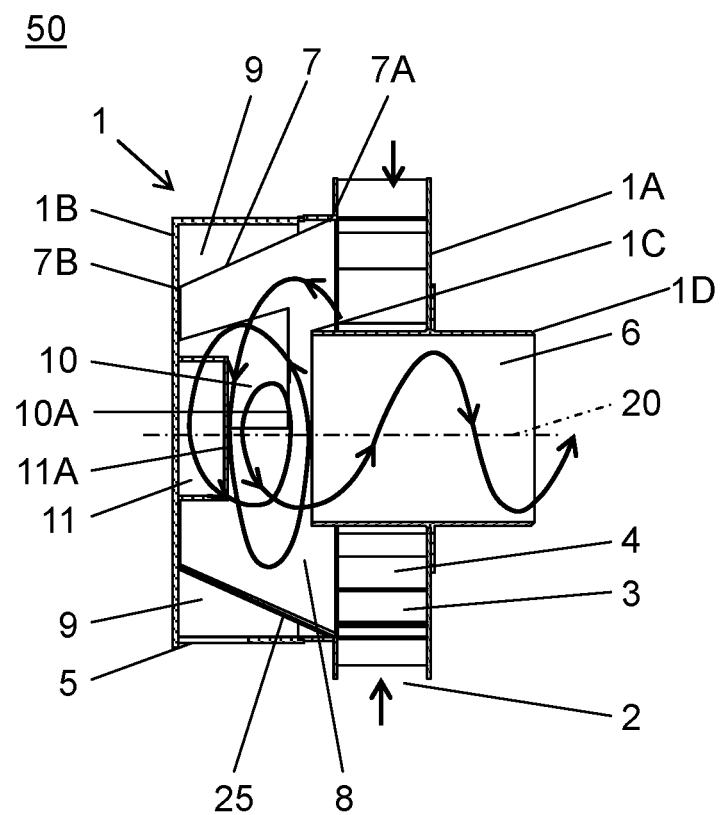
FIG. 2 is a cross-sectional view taken along the central axis of the device of FIG. 1.

FIG. 1 is an external perspective view of a cyclone separation device in accordance with the first exemplary embodiment of the present disclosure. FIG. 2 is a cross-sectional view along the central axis, i.e., taken along central axis 20 of cylindrical case 1 the device of FIG. 1.

As shown in FIG. 1 and FIG. 2, cyclone separation device 50 of the embodiment has cylindrical case 1, space partition plate 7, and cylindrical member 11.

Case 1 has first intake port 4, second intake port 5, and outflow port 6.

First intake port 4 has opening 2 circumferentially formed in a side surface on a side of end face 1A (the one end) of case 1, and fixed blades 3 arranged in circumferential opening 2. Fixed blades 3 are disposed in the whole circumference of opening 2 at regular intervals. The structure of the embodiment has 18 fixed blades 3 all of which are inclined at a same angle with respect to the center of the structure. Such arranged fixed blades 3 provide the airflow that has passed through first intake port 4 with swirling. In the structure of the embodiment, opening 2 of first intake port 4 is 360-degree opening, but it is not limited to; a part of the entire circumference may be closed. Besides, in the structure of the embodiment, as inner-circumference end sections 3A of fixed blades 3 are located at opening 2 of case 1, fixed blades 3 protrude to the outside of case 1 as the main unit. When outer-circumference end sections 3B of fixed blades 3 are located at opening 2, fixed blades 3 can be accommodated in case 1.

Second intake port 5 is disposed on a side surface on a side of end face 1B (the other end) opposite to end face 1A of case 1. As shown in FIG. 2, second intake port 5 is located at the lowermost part of the case 1 when central axis 20 of case 1 is kept a horizontal position. There is no opening on the side of end face 1B. End face 1B and case 1 may be formed as a one-piece structure, and the joint part between end face 1B and case 1 may have a rounded corner.

Outflow port 6 is formed into a cylinder and goes through the center of end face 1A. Outflow port 6 provides communication between the outside and the inside of device. The swirling airflow enters into case 1 through first intake port 4 and goes out of the case 1 through outflow port 6. The central axis of outflow port 6 agrees with central axis 20 of case 1. According to the embodiment, as shown in FIG. 2, the part of end face 1A at which outflow port 6 is disposed protrudes into the inside and the outside of the device. In the structure above, end 1C protrudes into the inside of first swirl chamber 8 beyond end 7A of space partition plate 7 (which will be described later). However, end 1C may not protrude into first swirl chamber 8 beyond end 7A. End 1D protrudes outside the device so that a duct (not shown) is connected thereto.

Space partition plate 7 is disposed in case 1 on the side of end face 1B. Space partition plate 7 partitions interior of case 1 into first swirl chamber 8 which is inner—circumference side space and second swirl chamber 9 which is outer-circumference side space. Space partition plate 7 is disposed with an inclination so that a cross-section area of first swirl chamber 8 on a plane perpendicular to central axis 20 of cylindrical case 1 gradually decreases from the side of outflow port 6 toward the side of end face 1B.

Of two ends of space partition plate 7 in the direction of central axis 20, one end (that will be referred to end 7A) on the side of outflow port 6 makes contact with a side face of case 1, and the other end (that will be referred to end 7B) makes contact with end face 1B of case 1.

That is, first swirl chamber 8 and second swirl chamber 9 are disposed in cylindrical case 1 via space partition plate 7. End face 1B of case 1 is in contact with the space of first swirl chamber 8 and second swirl chamber 9. The maximum diameter of first swirl chamber 8 is the same as that of second swirl chamber 9.

As described earlier, space partition plate 7 in the embodiment is disposed with an inclination. Space partition plate 7 has cylindrical wall 25 of a truncated cone shape. Cylindrical wall 25 may be a cylinder with no inclination.

First swirl chamber 8 and second swirl chamber 9 have communication with each other via through-hole 10 formed in space partition plate 7. Through-hole 10 is formed in a part of cylindrical wall 25 of space partition plate 7. With the structure above, first intake port 4 communicates with outflow port 6 via first swirl chamber 8; similarly, second intake port 5 communicates with first swirl chamber 8 via second swirl chamber 9 and through-hole 10, and further communicates with outflow port 6.

There are two airflows passing through-hole 10 in opposite directions; one is a part of a swirling airflow of first swirl chamber 8 that passes through through-hole 10 into second swirl chamber 9, and the other is an airflow coming from second swirl chamber 9 into first swirl chamber 8. Details will be described later.

Cylindrical member 11 is disposed in first swirl chamber 8 on the side of end face 1B of case 1 so as to have the central axis the same as central axis 20 of case 1. The distinctive feature of the structure of the embodiment is that cylindrical member 11 is disposed in first swirl chamber 8.

End face on the outflow-port side 11A, which is the face on the side of outflow port 6 (the side of the one end) of cylindrical member 11, is located closer to end face 1B than end face 10A of through-hole 10 is. As shown in the cross-sectional view of FIG. 2, end face on the outflow-port side 11A of cylindrical member 11 on the side of outflow port 6 should be located so as to overlap with through-hole 10. According to the structure of the embodiment, end face on the outflow-port side 11A is located closer to end face 1B than the center in the direction of central axis 20 of through-hole 10. Although the diameter of cylindrical member 11 is smaller than that of outflow port 6 in the structure, it is not limited to; it may be the same or may be greater.

As described earlier, two airflows flow through-hole 10 in opposite directions: one is a part of a swirling airflow of first swirl chamber 8 that passes through through-hole 10 into second swirl chamber 9, and the other is an airflow coming from second swirl chamber 9 into first swirl chamber 8, which will be described later.

According to visual observation in an experiment, in a region in through-hole 10 close to first intake port 4 (in FIG. 2), the airflow from first swirl chamber 8 to second swirl chamber 9 is superior to the other; in contrast, in a region in through-hole 10 close to end face 1B, the airflow from second swirl chamber 9 to first swirl chamber 8 is superior to the other.

Cylindrical member 11 blocks a foreign matter brought with the air coming from second swirl chamber 9 to first swirl chamber 8 so as not to go on the downstream side beyond outflow port 6. Therefore, cylindrical member 11 is disposed at a position that overlaps with a region in through-hole 10 close to end face 1B.

Unlike the structure of the embodiment, in a structure having no cylindrical member 11, a foreign matter brought from second swirl chamber 9 to first swirl chamber 8 comes close to central axis 20, around which the dominant airflow is going toward outflow port 6. Brought by the airflow, the foreign matter passes through outflow port 6 in the downstream direction. This causes deterioration of separation performance of cyclone separation device 50.

In contrast, in the structure having cylindrical member 11, a foreign matter comes from second swirl chamber 9 to first swirl chamber 8 collides with the side surface of cylindrical member 11 by an inertial force. Lost the momentum by the collision, the foreign matter starts to swirl with the swirling airflow flowing around cylindrical member 11 and is carried on the side of space partition plate 7 by centrifugal force, and again, it moves back to second swirl chamber 9 via through-hole 10. The workings of the structure prevent a re-entrainment phenomenon, i.e., the structure prevents the foreign matters that have been collected in second swirl chamber 9 from moving back to first swirl chamber 8 and flowing on the downstream side of the device.

In the structure, the opening space of second intake port 5 should preferably be determined to be about 0.5% to 3% of the opening space of opening 2 (i.e., first intake port 4). The opening space of second intake port 5 in the structure of the embodiment is determined to be very small, i.e., about 1.2% of the opening space of opening 2, which allows the airflow fed through first intake port 4 to be the mainly processed object by the device.

When the opening space of second intake port 5 is greater than 3% of the opening space of opening 2, an airflow fed through second intake port 5 into case 1 increases, which increases airflows moving from second swirl chamber 9 toward first swirl chamber 8 in through-hole 10 shown in FIG. 2. This hampers the movement of foreign matters from first swirl chamber 8 to second swirl chamber 9 (detailed description on airflow and movement of foreign matters in the state will be given later).

In contrast, a too-small opening space of second intake port 5 is not preferable. When the opening space of second intake port 5 is smaller than 0.5% of the opening space of opening 2, second intake port 5 fails to discharge a foreign matter, and collected foreign matters accumulate around second intake port 5. Second intake port 5 is the opening for discharging foreign matters and therefore needs a size enough for passing them through.

The flow of the air fed in such structured cyclone separation device 50 is described below.

When an air blower (not shown) is connected to outflow port 6 via a duct and is turned on, a negative pressure is caused in case 1. Under the state, air enters through first intake port 4 and second intake port 5 that are in open communication with outside air. At the time, since the opening space of second intake port 5 is determined to be very small (about 0.5% to 3% of the opening space of opening 2), the air mainly enters through first intake port 4 into case 1.

First, the flow of air fed through first intake port 4 is described. As shown in FIG. 2, the air fed through first intake port 4 becomes a swirling airflow by fixed blades 3. The airflow moves toward the direction of end face 1B of case 1 while swirling around in first swirl chamber 8. The cross-section area of first swirl chamber 8 on a plane perpendicular to central axis 20 of case 1 has a gradual decrease, which increases centrifugal force exerted on foreign matters contained in the swirling airflow. The movement of the foreign matters is described later. The swirling airflow moves toward the direction of end face 1B and, in the periphery of cylindrical member 11, it reverses its flowing direction with respect to central axis 20. The airflow passes by the center of first swirl chamber 8 toward outflow port 6 and goes out of the device.

A part of the swirling airflow in first swirl chamber 8 flows with directivity into second swirl chamber 9 via through-hole 10. Therefore, the airflow fed into second swirl chamber 9 moves in a direction the same as the airflow in first swirl chamber 8.

Next, the flow of air fed through second intake port 5 is described. The air fed through second intake port 5 is affected by the aforementioned swirling airflow fed into second swirl chamber 9 from first swirl chamber 8 and carried with the swirling airflow. That is, the air fed through second intake port 5 swirls around in second swirl chamber 9 and enters first swirl chamber 8 via through-hole 10. The air joins with the airflow in first swirl chamber 8 and goes out of outflow port 6 into the outside of the device. As described earlier, two airflows flow through-hole 10 in opposite directions. According to visual observation in an experiment, in a region close to end face 1A in through-hole 10, the airflow from first swirl chamber 8 to second swirl chamber 9 is superior to the other; in contrast, in a region close to end face 1B in through-hole 10, the airflow from second swirl chamber 9 to first swirl chamber 8 is superior to the other.

Next, how to separate a foreign matter from the air fed into the device will be described.

As a typical foreign matter, small insects, such as a mosquito, a drosophila, a fungus gnat, and a moth, are often drawn into the device through first intake port 4. When a foreign matter enters with air through first intake port 4, it undergoes a centrifugal force by a swirling airflow in first swirl chamber 8 and swirls around space partition plate 7 disposed on the side of the outer circumference of first swirl chamber 8. When the foreign matter comes close to through-hole 10 while swirling, it is moved outward by the centrifugal force and carried from first swirl chamber 8 via through-hole 10 into second swirl chamber 9. That is, second swirl chamber 9 is a separation chamber for accommodating foreign matters separated from the air.

Since being larger in mass than air, foreign matters undergo gravity and accumulate around second intake port 5 at the bottom of second swirl chamber 9. When a small insect is taken into second swirl chamber 9, it can move around in the chamber because it may be still alive just after being separated. At that time, due to a swirling airflow generated in second swirl chamber 9, the foreign matters are mostly carried, by centrifugal force, toward the outer circumference of second swirl chamber 9, and most of them don't move back to first swirl chamber 8 via through-hole 10.

Still, some of them may pass through-hole 10 and go back to first swirl chamber 8.

In that case, the foreign matters that have moved back to first swirl chamber 8 are carried toward central axis 20 by an inertia force. The foreign matters collide with the side surface of cylindrical member 11 and lose the momentum. A swirling airflow, which is generated in first swirl chamber 8, passes around cylindrical member 11, too. The foreign matters that have lost their momentum are swirled up by the swirling airflow in first swirl chamber 8. In swirling, the foreign matters are moved toward space partition plate 7 by centrifugal force and are brought again to second swirl chamber 9 via through-hole 10. That is, cylindrical member 11 prevents the re-entrainment phenomenon of foreign matters that have been separated into second swirl chamber 9.

As described earlier, two airflows pass through-hole 10 in opposite directions, and in a region close to end face 1B in through-hole 10, the airflow from second swirl chamber 9 to first swirl chamber 8 is superior to the other. Therefore, the foreign matters moved on the side of end face 1B are carried to first swirl chamber 8 with the airflow. Considering the movements of foreign matters, cylindrical member 11 is disposed on the side of end face 1B so that the foreign matters easily collide with its side surface. Further, as shown in the side view of FIG. 2, end face on the outflow-port side 11A of cylindrical member 11 on the side of the outflow port 6 is located at a position that overlaps with through-hole 10.

Second intake port 5 is an opening that also discharges the foreign matters that have been collected in second swirl chamber 9 into the outside of the device. Under a windless state in the outside of the device, the air enters through second intake port 5 and the foreign matters stay inside the device.

When natural wind flows in the outside of second intake port 5 of the device, the foreign matters that have been collected in second swirl chamber 9 are drawn out of second intake port 5 and are discharged. This is because that the static pressure in the outside of the device becomes lower than that in the inside of the device, as is explained by Bernoulli's theory.

In this way, the foreign matters are temporarily retained in second swirl chamber 9 and then discharged from the device by the help of natural wind. This allows the cyclone separation device to be a maintenance-free structure.

As described so far, cyclone separation device 50 of the embodiment has case 1, space partition plate 7, and cylindrical member 11. Case 1 has first intake port 4 and outflow port 6. First intake port 4 has opening 2 circumferentially formed in a side surface of case 1 on a side of end face 1A and a plurality of fixed blades 3 arranged in the circumferential opening 2. Outflow port 6, which is disposed on a face on the side of end face 1A, discharges a swirling airflow that enters through first intake port 4. Case 1 further has second intake port 5 disposed on a side surface on the side of end face 1B of case 1. Second intake port 5 is located at the lowermost part of the case 1 in the direction of gravitational force when central axis 20 is kept in a horizontal position. Space partition plate 7 partitions the interior of case 1 into first swirl chamber 8 and second swirl chamber 9. Space partition plate 7 has through-hole 10 that provides communication between first swirl chamber 8 and second swirl chamber 9. Cylindrical member 11 is disposed in first swirl chamber 8 on the side of end face 1B of case 1 such that the central axis of the cylindrical member 11 agrees with central axis 20. End face on the outflow-port side 11A of cylindrical member 11 is located within the range of the through-hole 10 in the direction of central axis 20.

The main flow of air comes through first intake port 4 into first swirl chamber 8 and goes to outflow port 6. Some air enter through second intake port 5 into second swirl chamber 9 and flow into first swirl chamber 8 via through-hole 10, and then go to outflow port 6.

When a foreign matter with the air fed through first intake port 4 into first swirl chamber 8, it is separated into second swirl chamber 9 via through-hole 10. That is, the second swirl chamber 9 functions as a separation chamber that collects foreign matters separated from the airflow at first swirl chamber 8.

Cyclone separation device 50 of the embodiment has a separation chamber that surrounds first swirl chamber 8. Further, the air in second swirl chamber 9 as the separation chamber forms swirling airflow.

The structure above prevents a separated foreign matter and a foreign matter that enters through second intake port 5 from flowing into first swirl chamber 8 via through-hole 10. Even when a foreign matter that has been collected in second swirl chamber 9 comes back to first swirl chamber 8 via through-hole 10, cylindrical member 11 works for separating again the foreign matter into second swirl chamber 9. The structure protects separation performance from deterioration, i.e., offers improved separation performance.

Besides, the device also functions as a hood that protects an air-inlet part disposed on an exterior wall of a building from the wind and rain. That is, the device is a hood having the function of separating foreign matters.

Usually, the device is disposed on an exterior wall. When it rains, the rainwater enters through first intake port 4 into the device, but it goes downward since first intake port 4 is a 360-degree opening. Further, the structure in which end 1C protrudes into first swirl chamber 8 beyond first intake port 4 prevents direct entry of rainwater into outflow port 6. As outflow port 6 is located at the center of an end face 1A of case 1, even if rainwater flows into the device, it never goes into a downstream section beyond outflow port 6. When case 1 is splashed with water, the waterdrops are attached to space partition plate 7 by a swirling airflow. Further, in the structure of the embodiment, space partition plate 7 inclines toward first intake port 4, by which the waterdrops on space partition plate 7 flow out of first intake port 4.

As for strong wind, the 360-degree opening of first intake port 4 lets it through. The structure, as is the case of rain described above, prevents direct blow-in of wind to outflow port 6.

In this way, having the function of separating foreign matters in the compact structure, the device reliably works as a hood that keeps out the wind and rain.

Second Exemplary Embodiment

In the description below, like parts are identified by the same reference marks as in the structure of the first exemplary embodiment, and a detailed description thereof is omitted.

Figure 3:
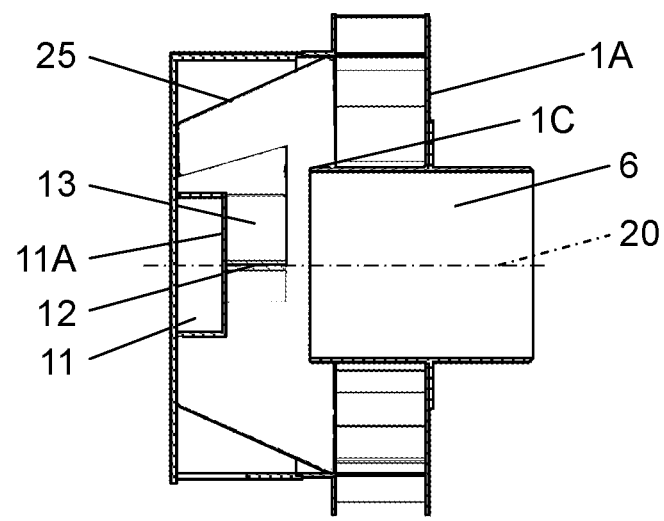
FIG. 3 is a cross-sectional view taken along the central axis of a cyclone separation device in accordance with a second exemplary embodiment of the present disclosure.

FIG. 3 is a cross-sectional view taken along the central axis of the cyclone separation device in accordance with the second exemplary embodiment of the present disclosure. The distinctive feature of the embodiment is that, as shown in FIG. 3, supporting member 12 and arc blades 13 are disposed on cylindrical member 11 on the side of outflow port 6. Supporting member 12 is formed into a cylinder and disposed at the center of cylindrical member 11. Arc blades 13 connects, in an arc shape, between supporting member 12 and the outer circumference of cylindrical member 11. Four arc blades 13 are radially arranged on supporting member 12 at regular intervals.

Figure 4:
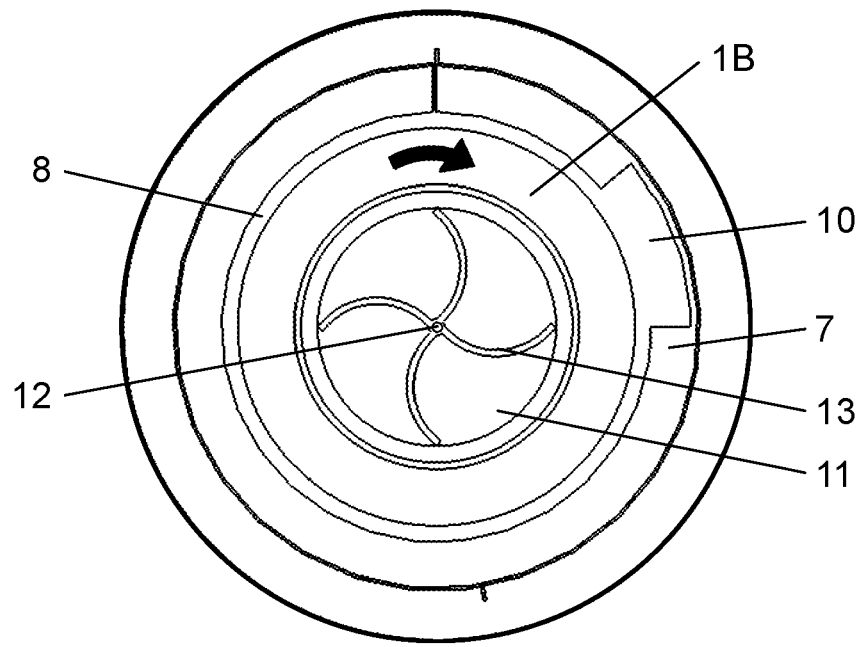
FIG. 4 is a back view of the device from which the end face is removed.

FIG. 4 is a back view of the cyclone separation device of the embodiment from which the end face is removed. Specifically, FIG. 4 shows a state in which end face 1A is removed from cyclone separation device 50. It shows cylindrical member 11, supporting member 12, and arc blades 13, seen from the side of outflow port 6.

As shown in a cross section perpendicular to central axis 20 in FIG. 4, four arc blades 13 of an arc shape are disposed on cylindrical member 11 on the side of outflow port 6 so as to be radially arranged at regular intervals.

Having two or more arc blades 13 is effective in decreasing pressure loss in cyclone separation device 50. Hereinafter, the effect of decreasing pressure loss by arc blades 13 is described.

The black arrow in FIG. 4 shows the flowing direction of a swirling airflow in first swirl chamber 8.

Arc blades 13 have an arc shape whose curved top is oriented in the flowing direction of the swirling airflow generated in first swirl chamber 8. That is, arc blades 13 are curved so as to receive the swirling airflow in first swirl chamber 8 by the inner side of the arc shape. With the structure of arc blades 13, swirling airflows are collected around central axis 20. The airflows are collected in the central part that is away from the wall surface of outflow port 6, by which friction loss between the wall surface of outflow port 6 and the airflows decreases; accordingly, the device decreases pressure loss. In the exemplary embodiment, to determine the diameter of cylindrical member 11, the inventor(s) examined the swirling airflow going to the downstream direction (in the direction of outflow port 6) by visualizing the airflow in fluid analysis, and determined the diameter of cylindrical member 11 so as to be nearly the same as the diameter of the airflow. The diameter of cylindrical member 11 is related to the inner diameter of outflow port 6; it measures 70% to 80% of the inner diameter of outflow port 6. As described above, the diameter of cylindrical member 11 and the diameter of the swirling airflow going to the downstream direction are nearly the same, which measures 70% to 80% of the inner diameter of outflow port 6.

Such structured device decreases friction loss when the swirling airflow passing through outflow port 6, decreasing pressure loss.

In the structure of the embodiment, each of arc blades 13 has a half-moon shape with a central angle of 180°, but it is not limited to; it may have a small curvature, i.e., the central angle may be smaller than 180°.

Arc blades 13 have to have a length in the direction of central axis 20 enough for collecting the swirling airflow to the periphery of central axis 20; specifically, the length has to be at least the same as the length of cylindrical member 11. The length of arc blades 13 of the embodiment is longer than cylindrical member 11 so as to have a space between end 1C, but the length may be extended to a position that overlaps with end 1C.

With the structure above, the swirling airflows are collected by arc blades 13 on the side of supporting member 12, i.e., around central axis 20. Such collected air mainly passes by the center of outflow port 6, i.e., around central axis 20.

The structure prevents the re-entrainment phenomenon, decreasing pressure loss of the airflow going toward outflow port 6; accordingly, decreasing pressure loss of the device.

Third Exemplary Embodiment

In the description below, like parts are identified by the same reference marks as in the structures of the previously described two exemplary embodiments, and a detailed description thereof is omitted.

Figure 5:
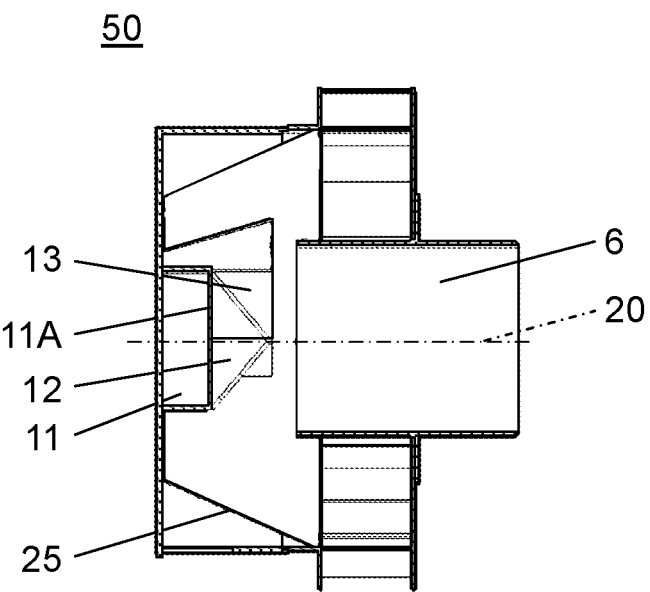
FIG. 5 is a cross-sectional view taken along the central axis of a cyclone separation device in accordance with a third exemplary embodiment of the present disclosure.
Figure 6:
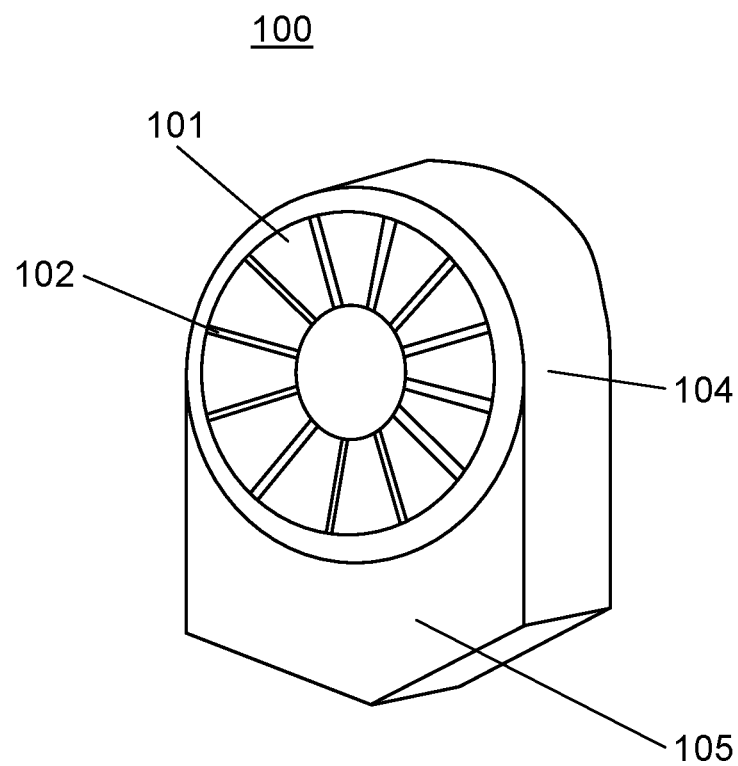
FIG. 6 is an external perspective view of a conventional cyclone separation device.
Figure 7:
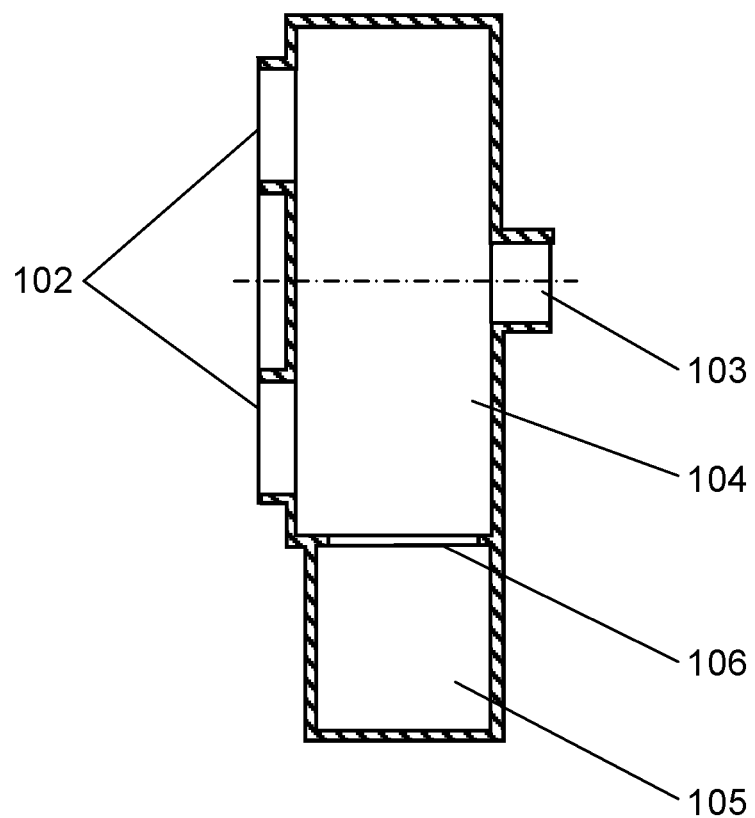
FIG. 7 is a cross-sectional view taken along the central axis of the conventional device.

FIG. 5 is a cross-sectional view taken along the central axis of a cyclone separation device in accordance with the third exemplary embodiment of the present disclosure.

The distinctive feature of the embodiment is that, as shown in FIG. 5, supporting member 12 has a conical shape. Besides, the bottom of the cone has a diameter the same as that of cylindrical member 11, and the top of the cone faces to outflow port 6. Four arc blades 13 are radially arranged on the circumference of conical-shaped supporting member 12 at regular intervals. The structure of the embodiment seen from the side of outflow port 6 is the same as shown in FIG. 4. The bending direction of arc blades 13 is the same as that described in the second exemplary embodiment.

As shown in the cross-sectional view of FIG. 5, the position of end face on the outflow-port side 11A of cylindrical member 11 on the side of outflow port 6 overlaps with through-hole 10.

By virtue of the conical shape of supporting member 12, the flowing direction the swirling airflows collected close to central axis 20 by arc blades 13 is changed toward outflow port 6. This causes the swirling airflow to have a great amount of component going toward the downstream direction and to have a smooth flowing in the center of outflow port 6 and go toward the downstream direction, by which the friction loss between the airflow and the wall surface of outflow port 6 decreases; accordingly, the pressure loss of the device decreases. That is, the structure prevents the re-entrainment phenomenon, providing a cyclone separation device with low pressure loss.

INDUSTRIAL APPLICABILITY

The cyclone separation device of the present disclosure prevents the re-entrainment phenomenon, reducing deterioration of the separation performance. Further, the device not only separates a foreign matter from captured air and puts it back to the outside of the device, but also prevents entry of the wind and rain. The advantages allow the device to be useful as an outdoor hood that is to be disposed at an air vent (on the intake-port side) of a building.

REFERENCE MARKS IN THE DRAWINGS 1 case
1A end face
1B end face
1C end
1D end
2 opening
3 fixed blades
3A inner-circumference end sections
3B outer-circumference end sections
4 first intake port
5 second intake port
6, 103 outflow port
7 space partition plate
7A end
7B end
8 first swirl chamber
9 second swirl chamber
10, 106 through-hole
10A end face
11 cylindrical member
11A end face on the outflow-port side
12 supporting member
13 arc blades
20 central axis
25 cylindrical wall
50, 100 cyclone separation device

The invention claimed is:
1. A cyclone separation device comprising:
 a first intake port circumferentially disposed in a side surface on a side of a one end of a case, and configured to allow air to be fed into the case;
 a fixed blade disposed on the first intake port and generating a swirling airflow to separate foreign matters contained in an air;
 a second intake port disposed in a side surface on a side of the other end of the case, and located at a lowermost part in a direction of gravity in a state where a central axis of the case is kept in a horizontal position;

an outflow port having a cylindrical shape, the outflow port being disposed in a one end face on the side of the one end of the case and configured to discharge the air fed into the case through the first intake port from the case;

a space partition plate partitioning an interior of the case into a first swirl chamber communicating with the first intake port and a second swirl chamber located closer to an outer-circumference side than the first swirl chamber is, the second swirl chamber communicating with the second intake port;

a through-hole disposed in the space partition plate so as to penetrate through the first swirl chamber and the second swirl chamber; and a cylindrical member disposed in the first swirl chamber on the side of the other end of the case, wherein the outlet port and the cylindrical member are arranged such that a central axis of the outlet port and a central axis of the cylindrical member agree with the central axis, and an end face of the cylindrical member on the side of the outflow port is located within a range overlapping the through-hole in the direction of the central axis of the through hole when the cylindrical member is seen from side view.

2. The cyclone separation device according to claim 1, wherein the first swirl chamber is formed such that a cross-section area perpendicular to the central axis gradually decreases from the side of the one end of the case toward the side of the other end of the case.

3. The cyclone separation device according to claim 1, further comprising a supporting member disposed on the end face of the cylindrical member, and arranged so as to be agree with the central axis, wherein the supporting member includes a plurality of arc blades each bent into an arc shape from the central axis toward the outer-circumference side, and a direction in which the arc blades are bent is the same as a rotating direction of the swirling airflow generated at the first intake port.

4. The cyclone separation device according to claim 3, wherein the supporting member has a conical shape whose bottom face has a diameter the same as the end face of the cylindrical member and whose top is formed on the side of the outflow port when the supporting member is seen from side view.

5. The cyclone separation device according to claim 2, further comprising a supporting member disposed on the end face of the cylindrical member, and arranged so as to be agree with the central axis, wherein the supporting member includes a plurality of arc blades each bent into an arc shape from the central axis toward the outer-circumference side, and a direction in which the arc blades are bent is the same as a rotating direction of the swirling airflow generated at the first intake port.

6. The cyclone separation device according to claim 5, wherein the supporting member has a conical shape whose bottom face has a diameter the same as the end face of the cylindrical member and whose top is formed on the side of the outflow port when the supporting member is seen from side view.

* * * * *